United States Patent [19]

Hosono et al.

[11] Patent Number: 4,929,220
[45] Date of Patent: May 29, 1990

[54] PULLEYS

[75] Inventors: Katsuaki Hosono; Kenji Kushita, both of Niigata, Japan

[73] Assignee: Mitsubishi Kinzoku Kabushiki Kaisha, Tokyo, Japan

[21] Appl. No.: 233,434

[22] Filed: Aug. 18, 1988

[51] Int. Cl.$^5$ .............................. F16H 55/30
[52] U.S. Cl. .................... 474/152; 29/892.3
[58] Field of Search ................ 474/152–157; 29/159 R, 159.1, 159.2, 159.3

[56] References Cited

U.S. PATENT DOCUMENTS

| D. 28,870 | 6/1898 | Sturges | 474/152 X |
| 580,291 | 4/1897 | Osmond | 474/152 X |

FOREIGN PATENT DOCUMENTS 0128562  8/1983  Japan ............................ 474/152

OTHER PUBLICATIONS

The International Journal of Powder Metallurgy & Powder Technology, 18/4, Oct. 1982, p. 350.
The International Journal of Powder Metallurgy & Powder Technology, 20/3, Jul. 1984, p. 250.
International Powder Metallurgy Directory, 83–84, p. 13.

Primary Examiner—Thuy M. Bui
Attorney, Agent, or Firm—Cushman, Darby & Cushman

[57] ABSTRACT

A pulley with plural fillets disposed on an outer peripheral surface thereof, which includes a plurality of recesses for lightening the weight thereof. The recesses are circumferentially formed in an inner cylindrical surface of a ring-shaped rim at equal angular intervals about an axis of the rim. Each of the recesses is disposed at a position of the inner surface of the rim opposite that of the fillet.

The pulley can be cheaply manufactured to be lightweight without reducing the mechanical strength thereof, and thereby can be exactly rotated at a high speed without vibrating and creating noise even if its center of gravity is displaced from its axis. Therefore, the pulley is adapted to be used for power transmission in an automobile.

5 Claims, 2 Drawing Sheets

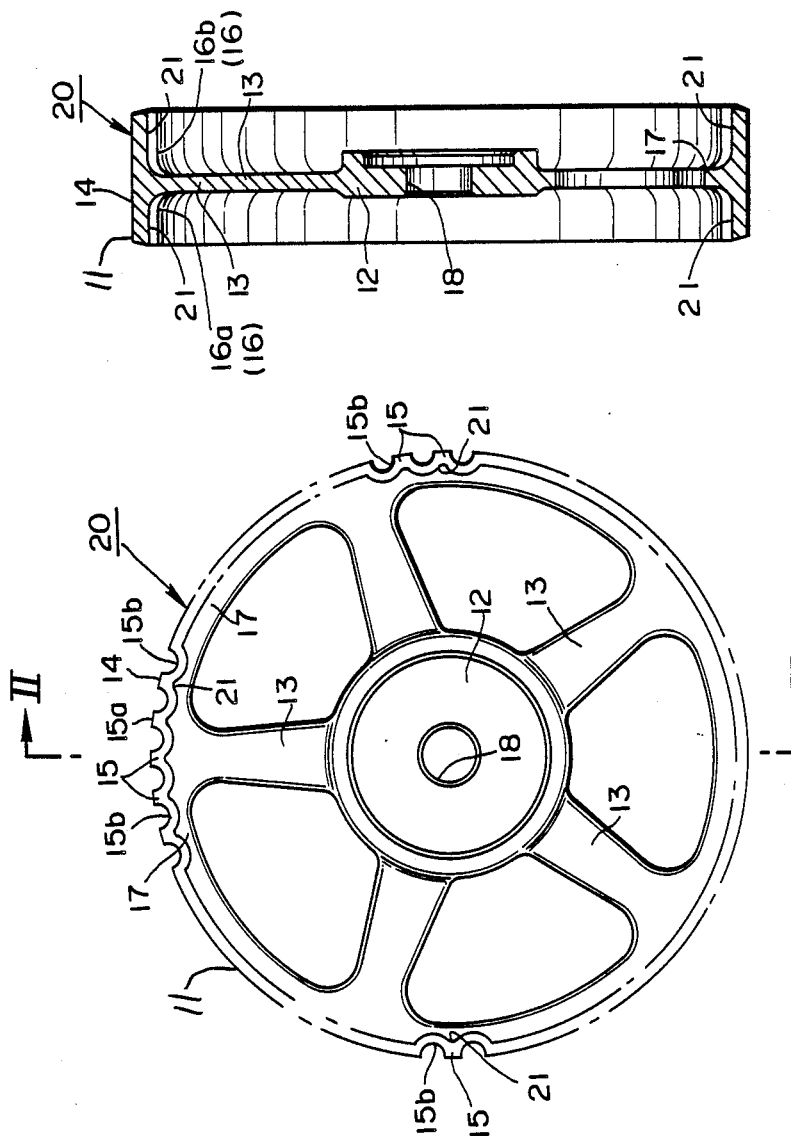

PULLEYS

BACKGROUND OF THE INVENTION

1. Field of the Invention

The present invention relates to a pulley having plural fillets for preventing a belt used for power transmission from slipping off the pulley.

2. Brief Description of the Prior Art

FIGS. 3 and 4 show an example of conventional pulleys whose members are made of sintered materials such as sintered steel, copper and the like. Reference numeral 10 denotes a conventional pulley which includes a ring-shaped rim 11, a disc-shaped hub 12 and five arms 13 for connecting the rim 11 with the hub 12 so as to be coaxial therewith. The rim 11 includes an outer peripheral surface 14 having plural fillets 15 circumferentially disposed thereon at equal angular intervals about an axis of the rim 11. An inner cylindrical surface 16 of the rim 11 has a ring-shaped ridge portion 17 circumferentially disposed on the central portion thereof so as to project radially inwardly, the ridge portion 17 being smaller in thickness than the width of the rim 11 represented by character W as shown in FIG. 4 so as to divide the inner surface 16 into two parts, or first and second inner surfaces 16a and 16b. Each of the fillets 15 on the outer surface 14 extends parallel to the axis of the rim 11 and its top land 15a forms a plain surface together with the outer surface 14 of the rim 11. The hub 12 has an aperture 18 of a circular cross section disposed at the center thereof so as to be coaxial therewith, the aperture 18 being adapted for insertion of a rotatable shaft (not shown) for power transmission. Each of the arms 13 extends radially outwardly from a peripheral portion of the hub 12 to the ridge portion 17 of the rim 11 at equal angular intervals about an axis of the hub 12 or the axis of the rim 11.

Such a conventional pulley 10, used for power transmission in automobiles, is required to rotate silently at high speed, and therefore has been made from sintered materials which have a mechanical strength sufficient to endure those conditions. However, because sintered materials are expensive, the amount of material used to form the pulley 10 is preferably kept to a minimum.

Also, when the center of gravity of the pulley 10 is off-center, the pulley 10 rotates eccentrically and tends to vibrate and create noise. In this case, the problem can be resolved by lightening the weight of the pulley 10. Heretofore, the thickness of the rim 11 represented by character T as shown in FIG. 4, i.e., the distance of the inner surface 16 of the rim 11 to the top land 15a of the fillet 15, is made small. However, the thickness of the rim 11 represented by character t as illustrated in FIG. 3, i.e., the distance of the inner surface 16 to a bottom land 15b of the space defined between adjacent fillets 15 cannot be made smaller than the thickness necessary to provide sufficient mechanical strength to transmit power. Therefore, the pulley 10 requires some improvement to adequately transmit power in automobiles.

SUMMARY OF THE INVENTION

Accordingly, it is an object of the present invention to provide a light weight pulley which can be cheaply manufactured without reducing the mechanical strength thereof.

According to an aspect of the present invention, there is provided a pulley comprising a rim including an outer peripheral surface having plural fillets circumferentially disposed thereon at equal angular intervals about an axis of the rim, an inner surface having a ridge portion circumferentially disposed at the center thereof so as to project radially inwardly, and thereby the ridge portion divides the inner surface into two parts, a hub having an aperture disposed at the center thereof so as to be coaxial therewith and connecting means connecting the hub and the rim, the rim having plural recesses circumferentially formed in the inner surface thereof at equal angular intervals about an axis thereof, each of the recesses disposed at a position of the inner surface opposite that of a fillet.

BRIEF DESCRIPTION OF THE DRAWINGS

The invention will now be described with reference to the accompanying drawings wherein:

FIG. 1 is a fragmentary plan view showing a pulley of the present invention;

FIG. 2 is a cross-sectional view taken along line II—II in FIG. 1;

DESCRIPTION OF PREFERRED EMBODIMENTS OF THE INVENTION

Figures 3, 4:
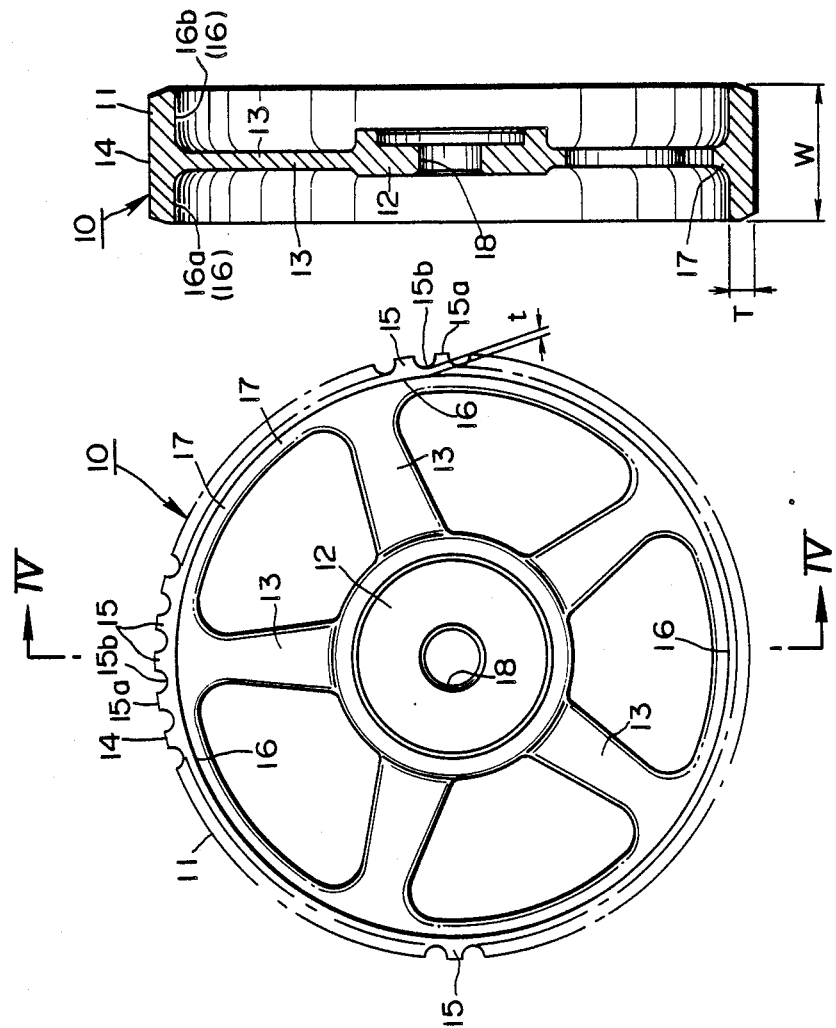
FIG. 3 is a fragmentary plan view of a conventional pulley.
FIG. 4 is a cross-sectional view taken along line IV—IV in FIG. 3.

In FIGS. 1 and 2, components and parts corresponding to those shown in FIGS. 3 and 4 are designated by the same referece numerals, and therefore the description of the corresponding components and parts are omitted to avoid repetition of the same description.

FIGS. 1 and 2 illustrate a pulley according to the present invention. Reference numeral 20 denotes a pulley which includes the ring-shaped rim 11 provided with plural recesses or grooves 21 formed in the inner surface 16 thereof, in addition to the disc-shaped hub 12 and the five arms 13.

As for the rim 11, the grooves 21 of identical size and shape are circumferentially formed in the first and second inner surfaces 16a and 16b at equal angular intervals about the axis of the rim 11. In the first inner surface 16a, each of the grooves 21 is disposed at a position opposite that of the fillet 15 on the outer surface 14, and extends parallel to the axis of the rim 11 from one end of the first inner surface 16a to the ridge portion 17 and recedes from the inner surface 16 outwardly to the top land 15a of the fillet 15.

The peripheral walls of adjacent grooves 21 are continuously connected to each other near the bottom land 15b of the space defined between adjacent fillets 15 so as to extend uniformly along the bottom land 15b with a uniform distance of the wall of the groove 21 to the bottom land 15b.

A bottom of each of the grooves 21 recedes close to the top land 15a of the corresponding fillet 15 so as to reduce the distance of the bottom of the groove 21 to the top land 15a of the fillet 15.

The former distance is preferably determined so as to be identical to the latter. The center of gravity of the pulley 20 is located on the axis of the aperture 18 when the former distance is identical to the latter.

The depth of the groove 21 is determined on the basis of variables such as the latter distance, materials used for the rim 11, the use of the pulley 20, and the like.

Such grooves 21 are formed in the inner surface 16 so as to be symmetrical about the axis of the rim 11. The number of the grooves 21 formed are optional.

Further, the bottom of each groove 21 has a curved cross section and is preferably formed to avoid concentrating a stress therein. Also, in the second inner surface 16b, each of the grooves 21 has a size and shape identical to those of the first inner surface 16a. The opposed inner surfaces 16a and 16b of identical size and shape have a surface configuration similar to a wave surface, and similar to the configuration of the outer surface 14 of the rim 11.

In this embodiment of the present invention, the pulley 20 can be lightened below the required weight because the rim 11 can be manufactured so as to be thin without reducing the mechanical strength of the rim 11 by virtue of the grooves 21 disposed at the first and second inner surfaces 16a and 16b opposite that of the fillet 15. Therefore, the amount of expensive sintered materials can be reduced and the pulley 20 can be cheaply manufactured. Also, the lightened pulley 20 can be silently rotated at a high speed without vibrating even if the center of the gravity thereof is off-centered, therefore, can be used to transmit power in an automobile.

Furthermore, exact power transmission can be carried out between the pulley 20 and a belt where the belt has a plurality of fillets longitudinally disposed at an inner surface thereof at a pitch corresponding to the pitch of the fillets 15 of the pulley 20. When the fillets of the pulley engage with the fillets of the belt, the friction causes the engaged portions of the opposed fillets to heat. Therefore, the belt tends to expands longitudinally by the frictional heat, so that the pitch of the belt becomes different than that of a pulley. As the result, the pulley is susceptible to a transmission loss. The heat of the friction of the pulley 20 according to the present invention, however, can be effectively radiated outwardly because the surface area of the inner surface 16 of the pulley 20 is larger than that of the conventional pulley 10 as shown in FIGS. 3 and 4. Therefore, the pulley 20 can prevent the belt from expanding by the heat of friction, and can be exactly rotated at a high speed. Thus, the pulley 20 is particularly adapted for power transmission in automobiles.

It should be noted that, although the rim 11 of the pulley 20 shows the grooves 21 as recesses, the rim 11 may have one or more apertures opening radially inwardly formed in the inner surface 16 thereof.

What is claimed is:

1. A pulley comprising a rim including an outer peripheral surface having plural fillets circumferentially disposed thereon at equal angular intervals about an axis of said rim, an inner surface having a ridge portion circumferentially disposed on the center thereof so as to project radially inwardly, a hub having an aperture disposed at the center thereof so as to be coaxial therewith and connecting means connecting said hub and said rim, said rim having plural recesses circumferentially formed in said inner surface thereof at equal angular intervals about an axis thereof, each of said recesses disposed at a position of said inner surface opposite that of said fillet.

2. A pulley according to claim 1, wherein each of said recesses is formed in said inner surface of said rim so as to reduce a distance of a bottom thereof to a top land of said fillet.

3. A pulley according to claim 1, wherein each of said recesses is formed in said inner surface of said rim so that a distance of a bottom thereof to a top land of said fillet is equal to a distance of said inner surface of said rim to a bottom land of a space defined between said adjacent fillets.

4. A pulley according to claim 1, wherein each of said recesses are formed so as to have a curved cross section.

5. A pulley according to claim 1, wherein each of said connecting means extend radially outwardly from said hub to said ridge portion of the rim at equal angular intervals about an axis of said hub.

* * * * *